May 26, 1925.

R. K. CROMER

SAW SET GAUGE

Filed July 14, 1924

1,538,975

R. K. Cromer,
Inventor

By Clarence A. O'Brien
Attorney

Patented May 26, 1925.

1,538,975

UNITED STATES PATENT OFFICE.

RAYMOND K. CROMER, OF JEFFERSON, TEXAS, ASSIGNOR OF ONE-HALF TO J. E. VAUGHAN, OF JEFFERSON, TEXAS.

SAW-SET GAUGE.

Application filed July 14, 1924. Serial No. 725,917.

*To all whom it may concern:*

Be it known that I, RAYMOND KIEFFER CROMER, a citizen of the United States, residing at Jefferson, in the county of Marion and State of Texas, have invented certain new and useful Improvements in a Saw-Set Gauge, of which the following is a specification.

This invention relates to new and useful improvements in tools which are principally adapted for use in connection with saws preferably of the cross-cut type and has for its principal object to provide a saw-set for gauging the teeth of the saw.

A further object of the invention is to provide a saw-set gauge of the above-mentioned character, wherein the tool is provided with saw-sets of various angles thereby obviating the necessity of having to employ a number of saw-set gauges in order to accurately ascertain the position of the saw teeth.

A further object of the invention is to provide a tool of the above-mentioned character, wherein means is associated therewith for facilitating the alining of the teeth in their proper positions.

A further object is to provide a tool of the above-mentioned character, which is simple in construction, inexpensive, strong and durable, and furthermore adapted for the purposes for which it is designed.

Other objects and advantages of this invention will become apparent during the course of the following description.

In the accompanying drawing forming a part of this specification and in which like numerals designate like parts throughout the same:

Figure 1:
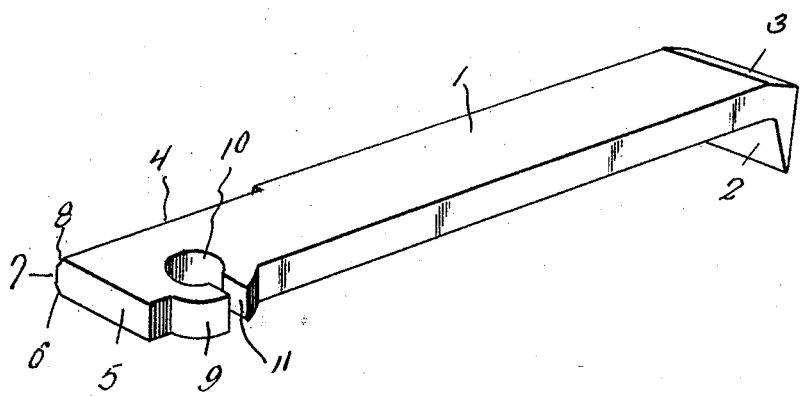
Figure 1 is a perspective view of my improved tool.
Figure 2:
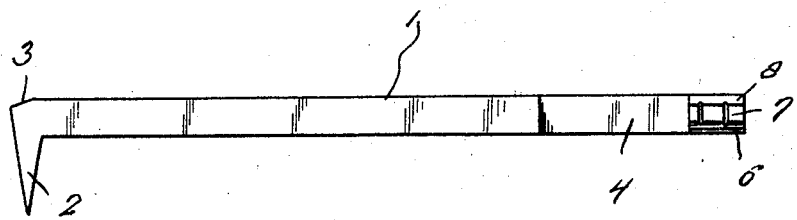
Fig. 2 is a rear edge elevation thereof.

In the drawing wherein for the purpose of illustration is shown the preferred embodiment of my invention, the numeral 1 designates the body portion of the tool and is substantially constructed of a bar of metal of a suitable length. One end of the bar terminates in the downwardly extending sharpened bit such as is shown at 2 and the upper edge of the body portion directly above the bit 2 is beveled as shown at 3 to provide a means for enabling the saw teeth of a saw blade to be set at the proper angle, it being understood of course that in use the tool has the bit portion 2 driven into a log or stump and the saw blade is placed on the tool so that the teeth thereof rest on the beveled portion 3 and a hammer or the like is employed for setting the teeth.

The rear edge of the body portion 1 is cut away as shown at 4, and the cutaway portion extends from a point adjacent the forward end 5 of a tool to a point adjacent the intermediate portion of the tool. The purpose of the cutaway portion is to provide a means for permitting the tool to move freely over the surface of a saw blade when the latter has resin collected thereon when the gauge is in use.

The portion of the rear edge or face of the tool between the cutaway portion and the forward end 5 is provided with the beveled faces 6, 7 and 8 respectively, and each of the beveled portions is arranged at an angle with respect to each other, all of the angles being dissimilar for the purposes hereinafter to be more fully described.

The front edge of the tool 1 adjacent the forward end thereof is provided with an extension or projection such as is shown at 9 and an opening 10 extends to the body portion adjacent the lower end 5 of the tool and also adjacent the projection 9. A slot 11 is provided in the projection 9 and extends radially from the opening 10 and communicates therewith in the manner clearly shown in Fig. 1 of the drawing. The purpose of this construction is to provide a means whereby the teeth out of alinement may be sprung back to their normal position by placing the tool over the teeth which are out of alinement so that the slot 11 will receive each of the teeth which are out of alinement and by actuating the opposite end of the tool, the tooth within the notch 11 will be sprung back to its normal position.

In using the saw-set gauge to determine the various positions of the saw teeth in order to accurately ascertain whether or not certain of the teeth are out of alinement, the tool is actuated so that the rear edge of the tool will fit against the body or flat surface of the saw blade and so that one of the beveled faces provided on the rear edge of the tool will engage the saw teeth, the particular beveled face which is used depending upon the angle at which the saw teeth are disposed. By moving the tool back and forth on the saw blade the operator may readily ascertain just which teeth are out of alinement and by using the tool as heretofore set forth wherein the notch 11 engages the teeth out of alinement, the latter may be sprung back to their normal alining positions.

It will thus be seen from the foregoing description, that a saw-set gauge has been provided which is simple in construction, inexpensive, and further strong and durable; and the provision of a number of saw-set gauges obviates the necessity of having to purchase a number of gauges in order to accurately ascertain the exact position of the saw teeth of a saw. The simplicity in which my device is adapted to operate furthermore enables the same to be efficiently and positively used for the purposes above set forth.

While I have shown the preferred embodiment of my invention, it is to be understood that various changes in the size, shape, and arrangement of parts may be resorted to without departing from the spirit of the invention and the scope of the appended claim.

Having thus described my invention, what I claim is:—

A saw gauge comprising a flat metal bar, one longitudinal edge of which constitutes a straight-edge for slidably contacting the body portion of the saw blade, the outer end of said straight edge being formed with a plurality of beveled surfaces for gauging the set of the saw teeth, said beveled surfaces being comparatively short and disposed in longitudinal alinement with the longitudinal axis of the bar, the beveled surfaces merging into each other and the degree of bevel of the surfaces varying with respect to each other, and a notch formed in the last-named edge of said bar and providing a clearance space between the straight-edge proper and said teeth gauging bevels.

In testimony whereof I affix my signature.

R. K CROMER.